(12) United States Patent
Chiu et al.

(10) Patent No.: US 12,539,351 B2
(45) Date of Patent: Feb. 3, 2026

(54) BONE SUBSTITUTE COMPOSITION

(71) Applicant: METAL INDUSTRIES RESEARCH & DEVELOPMENT CENTRE, Kaohsiung (TW)

(72) Inventors: Kuan-Yu Chiu, Chiayi County (TW); Yen-Hao Chang, Kaohsiung (TW); Chun-Chieh Tseng, Kaohsiung (TW); Tung-Lin Tsai, Tainan (TW); Chun-Ming Chen, Kaohsiung (TW); Yue-Jun Wang, New Taipei (TW); Tzyy-Ker Sue, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 445 days.

(21) Appl. No.: 18/186,354

(22) Filed: Mar. 20, 2023

(65) Prior Publication Data
US 2024/0181127 A1   Jun. 6, 2024

(30) Foreign Application Priority Data

Dec. 2, 2022 (TW) .................................. 111146324

(51) Int. Cl.
*A61L 27/12* (2006.01)
*A61L 27/22* (2006.01)
*A61L 27/58* (2006.01)
*C08L 5/00* (2006.01)

(52) U.S. Cl.
CPC ............... *A61L 27/12* (2013.01); *A61L 27/22* (2013.01); *A61L 27/58* (2013.01); *C08L 5/00* (2013.01); *A61L 2430/02* (2013.01)

(58) Field of Classification Search
None
See application file for complete search history.

(56) References Cited

U.S. PATENT DOCUMENTS 5,053,212 A * 10/1991 Constantz ............. C01B 25/327
433/199.1

FOREIGN PATENT DOCUMENTS

EP          3349815 B1    3/2020
WO     WO-2009110917 A1 *  9/2009 ............. A61L 24/02

* cited by examiner

*Primary Examiner* — Robert A Wax
*Assistant Examiner* — William Craigo
(74) *Attorney, Agent, or Firm* — WPAT, PC

(57) ABSTRACT

A bone substitute composition includes a bone substitute matrix and a conditioning solution. The bone substitute matrix includes 85% to 98% by weight of alkaline calcium phosphate powder, 1% to 10% by weight of a polymer, and 1% to 5% by weight of a crosslinker. The conditioning solution includes 90% to 97% by weight of water, 1% to 5% by weight of a phosphate, and 1% to 5% by weight of a water-soluble acidic compound.

14 Claims, 7 Drawing Sheets

BONE SUBSTITUTE COMPOSITION

CROSS REFERENCE TO RELATED APPLICATION

The application claims the benefit of Taiwan application serial No. 111146324, filed on Dec. 2, 2022, and the entire contents of which are incorporated herein by reference.

BACKGROUND OF THE INVENTION

1. Field of the Invention

The present invention relates to a bone substitute composition and, more particularly, to a flexible bone substitute composition.

2. Description of the Related Art

Bones may be damaged by several causes, such as a surgery, impingement by an external stress, tumor clearance, etc., and defects may form at the damaged sites of the bones. Conventionally, bone substitute compositions may be used to temporarily fill the defects. The conventional bone substitute compositions may be gradually absorbed by human bodies and be replaced by newly formed bones during the subsequent bone healing process.

The conventional bone substitute compositions, for example, can include calcium phosphate cement (CPC) and a conditioning solution, in which the calcium ions of the CPC react with the phosphate ions in the conditioning solution and generate hydroxyapatite ($Ca_5(PO_4)_3$) after the CPC is mixed with the conditioning solution. Therefore, the CPC gradually hardens and transforms from a flowable, pulpy bone substitute composition into a bulk bone substitute, and the shape of which meets the shape of the defects.

However, when using the conventional bone substitute compositions, a physician usually needs to mix and stir the CPC with the conditioning solution to obtain a uniform mixture, load the mixture into an injector, and then inject the pulpy bone substitute into defects of a damaged bone via a inject head of the injector. Accordingly, it is inconvenient for physicians to use the conventional bone substitute compositions.

Thus, it is necessary to provide an improved bone substitute composition.

SUMMARY OF THE INVENTION

To solve the above problem, it is an objective of the present invention to provide a bone substitute composition, which may be applied to a defect of a damaged bone by the hand of a physician (or other surgical instruments other than an injector).

As used herein, the term "a", "an" or "one" for describing the number of the elements and members of the present invention is used for convenience, provides the general meaning of the scope of the present invention, and should be interpreted to include one or at least one. Furthermore, unless explicitly indicated otherwise, the concept of a single component also includes the case of plural components.

A bone substitute composition according to the present invention may include a bone substitute matrix including 85% to 98% by weight of alkaline calcium phosphate powder, 1% to 10% by weight of a polymer, and 1% to 5% by weight of a crosslinker; and a conditioning solution including 90% to 97% by weight of water, 1% to 5% by weight of a phosphate, and 1% to 5% by weight of a water-soluble acidic compound.

Thus, the bone substitute composition of the present invention may transform into a clayey bone substitute after the bone substitute matrix is mixed with the conditioning solution, and the clayey bone substitute may be reshaped at will by applying a force within 10 to 30 minutes after the formation of the clayey bone substitute. The clayey bone substitute gradually hardens and transforms into a non-reshapable, rigid skeletal bone substitute after 30 minutes of the formation of the clayey bone substitute. Accordingly, a physician may mix the bone substitute matrix and the conditioning solution to obtain the clayey bone substitute, and substitute the clayey bone substitute into a defect of a damaged bone by hand (or other surgical instruments other than an injector), and wait for the hardening of the clayey bone substitute to form a skeletal bone substitute having a similar shape as the defect. Therefore, the present invention bone substitute provides an effect for improving the convenience of surgery.

In an example, the volume ratio of the bone substitute matrix to the conditioning solution may be between 1:1 to 1:3. Thus, the hardening time of the clayey bone substitute may be efficiently controlled by using a suitable volume ratio of the bone substitute matrix to the conditioning solution, which may maintain the efficiency of bone substitute surgeries, improve the quality of such surgeries, and reduce the cost of such surgeries.

In an example, the particle size of the alkaline calcium phosphate powder may be between 10 to 1200 μm. Thus, the dispersity of the alkaline calcium phosphate powder in the bone substitute matrix may be increased, such that the alkaline calcium phosphate powder and the polymer may be more likely to crosslink under the action of the crosslinker.

In an example, the alkaline calcium phosphate powder may be selected from at least two of tetracalcium phosphate powder, monocalcium phosphate monohydrate powder, dibasic calcium phosphate powder, calcium sulfate hemihydrate powder, tricalcium phosphate powder, and monocalcium phosphate anhydrate powder. For example, the alkaline calcium phosphate powder may include the tetracalcium phosphate powder and the monocalcium phosphate monohydrate powder, and the molar ratio of the tetracalcium phosphate powder to the monocalcium phosphate monohydrate powder may be between 3:1 to 5:1. Alternatively, the alkaline calcium phosphate powder may include the tetracalcium phosphate powder and the dibasic calcium phosphate powder, and the molar ratio of the tetracalcium phosphate powder to the dibasic calcium phosphate powder may be between 1:1 to 1:3. Alternatively, the alkaline calcium phosphate powder may include the tetracalcium phosphate powder and the calcium sulfate hemihydrate powder, and the molar ratio of the tetracalcium phosphate powder to the calcium sulfate hemihydrate powder may be between 0.5:1 to 2.5:1. Alternatively, the alkaline calcium phosphate powder may include the tricalcium phosphate powder and the monocalcium phosphate monohydrate powder, and the molar ratio of the tricalcium phosphate powder to the monocalcium phosphate monohydrate powder may be between 1:1 to 1:3. Alternatively, the alkaline calcium phosphate powder may include the tricalcium phosphate powder and the monocalcium phosphate anhydrate powder, and the molar ratio of the tricalcium phosphate powder to the monocalcium phosphate anhydrate powder may be between 1:1 to 1:2. Thus, hydroxyapatite or brushite may be formed by using suitable alkaline calcium phosphate powder, such that bone cells may more likely to attach to the skeletal bone substitute.

In an example, the polymer may be selected from at least one of chitin, hyaluronic acid, gelatin, collagen, and chitosan. Thus, the flexibility of the unhardened, clayey bone substitute may be improved by using a suitable polymer, such that the convenience of clinical treatment may be improved. Moreover, the pore size and porosity of the hardened, rigid skeletal bone substitute may also be increased, such that the number of open pores of the rigid skeletal bone substitute may be increased to facilitate the delivery of nutrients and angiogenesis. In addition, this can ensure that the substituted bones still have a certain level of mechanical strength to provide a better growth environment for bone cells.

In an example, the crosslinker may be selected from at least one of 1,4-butanediol diglycidyl ether, formaldehyde, and pentane-1,5-dial. Thus, the crosslinking may be facilitated by using a suitable crosslinker.

In an example, the phosphate may be selected from at least one of sodium hydrogen phosphate and sodium dihydrogen phosphate. Thus, the number of phosphate ions in the conditioning solution may be increased.

In an example, the water-soluble acidic compound is selected from at least one of phosphoric acid, a bifunctional organic acid, a polycyclic acid, and citric acid. Thus, the pH value of the conditioning solution may be adjusted by using a suitable water-soluble acidic compound to improve the water solubility of the alkaline calcium phosphate powder.

In an example, the bone substitute composition further includes an additive of at least one trace element, with the trace element being absorbable or metabolizable by a human body. Thus, effects of regeneration and repair of bone cells can be increased.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

DETAILED DESCRIPTION OF THE INVENTION

Figure 1:
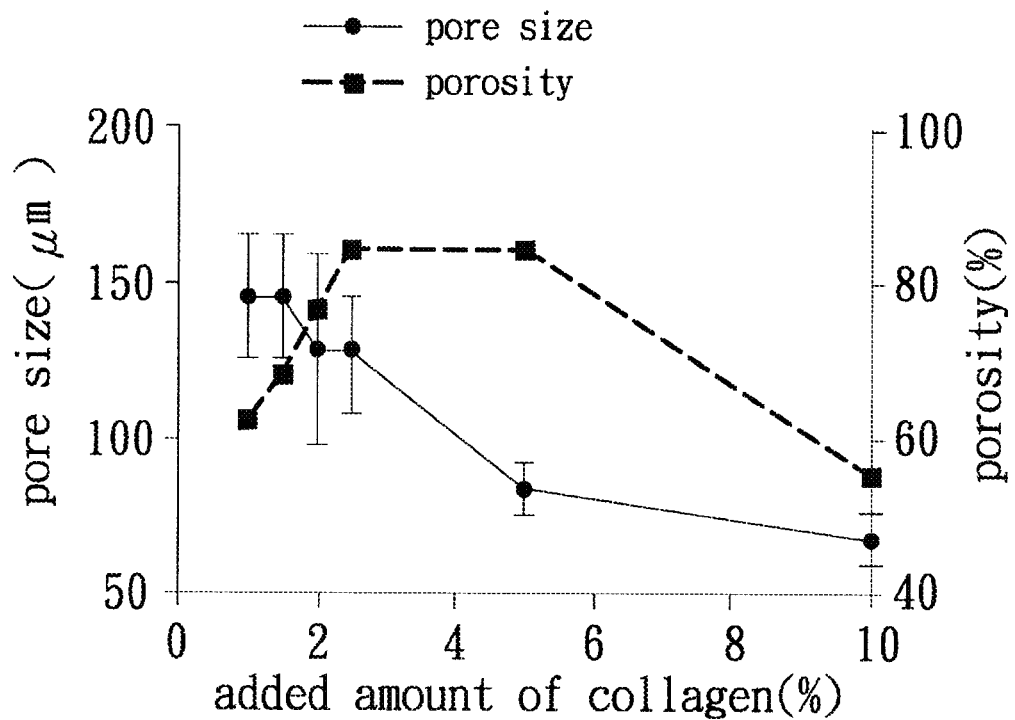
FIG. 1 is a schematic chart illustrating changes in pore size and porosity before hardening of the bone substitute compositions in groups A1 to A6 according to the added amount of collagen in accordance with the Experiment A of the present invention.

In an embodiment of the present invention, the bone substitute composition may include a bone substitute matrix and a conditioning solution. The bone substitute composition may transform into a clayey bone substitute with plasticity after the bone substitute matrix is mixed with the conditioning solution. The clayey bone substitute has an Atterberg plastic index between 18 to 30. Therefore, the clayey bone substitute may be reshaped at will by applying a force within 10 to 30 minutes after the formation of the clayey bone substitute. The clayey bone substitute gradually hardens and transforms into a non-reshapable, rigid skeletal bone substitute after 30 minutes of the formation of the clayey bone substitute.

Specifically, the bone substitute matrix may include 85% to 98% by weight of alkaline calcium phosphate powder, which may facilitate bone cells to attach to the skeletal bone substitute. For example, the alkaline calcium phosphate powder may be the mixture of any two type of tetracalcium phosphate (TTCP) powder, monocalcium phosphate monohydrate ($Ca(H_2PO_4)_2 \cdot H_2O$, MCPM) powder, dibasic calcium phosphate ($CaHPO_4 \cdot 2H_2O$, DSP) powder, calcium sulfate hemihydrate ($CaSO_4 \cdot \frac{1}{2}H_2O$, CSH) powder, tricalcium phosphate ($\beta\text{-}Ca_3(PO_4)_2$, β-TCP) powder, and monocalcium phosphate anhydrate ($Ca(H_2PO_4)_2$, MCPA) powder, with the proviso that the two types of the alkaline calcium phosphate powder, taken together, are able to form hydroxyapatite or brushite. In an embodiment, the alkaline calcium phosphate powder can include the TTCP powder and the MCPM powder, in which the molar ratio of the TTCP powder to the MCPM powder may be preferably between 3:1 to 5:1. In another embodiment, the alkaline calcium phosphate powder can include the TTCP powder and the DCP powder, in which the molar ratio of the TTCP powder to the DCP powder may be preferably between 1:1 to 1:3. In yet another embodiment, the alkaline calcium phosphate powder can include the TTCP powder and the CSH powder, in which the molar ratio of the TTCP powder to the CSH powder may be preferably between 0.5:1 to 2.5:1. In still another embodiment, the alkaline calcium phosphate powder can include the β-TCP powder and the MCPM powder, in which the molar ratio of the β-TCP powder to the MCPM powder may be preferably between 1:1 to 1:3. In other embodiments, the alkaline calcium phosphate powder can include the β-TCP powder and the MCPA powder, in which the molar ratio of the β-TCP powder to the MCPA powder may be preferably between 1:1 to 1:2.

The bone substitute matrix may further include 1% to 10% by weight of a polymer. The flexibility of the unhardened, clayey bone substitute can be increased by adding the polymer. The pore size and porosity of the hardened, rigid skeletal bone substitute may also be increased by adding the polymer, such that the number of open pores of the rigid skeletal bone substitute may be increased to facilitate the delivery of nutrients and angiogenesis. Moreover, this can ensure that the substituted bones still have a certain level of mechanical strength to provide a better growth environment for bone cells. As an example, the polymer may be any selected from chitin, hyaluronic acid, gelatin, collagen, or chitosan, or a mixture of at least two of these polymers.

The bone substitute matrix may further include 1% to 5% by weight of a crosslinker. For example, the crosslinker may be any selected from 1,4-butanediol diglycidyl ether, formaldehyde, and pentane-1,5-dial, or a mixture of at least two of these crosslinkers.

It is noted that the particle size of the alkaline calcium phosphate powder may be preferably between 10 to 1200 μm to improve the uniformity of the clayey bone substitute. For example, the alkaline calcium phosphate powder having particle size between 10 μm to 1200 μm can be produced by a wet grinding process using grinding balls. Specifically, the particle size of a sample to be grinded (i.e., the alkaline calcium phosphate powder and/or the powder of the polymer) may be lowered by introducing the sample, the grinding balls, and a liquid medium into a ball mill, and crushing the sample by a compressive force, a shear force, an impact force, and a grinding force provided by the grinding balls.

In this embodiment, the volume ratio of the powder phase (i.e., the sample to be grinded) to the grinding balls may be between 1:1 to 1:10, and the volume ratio of the solid phase (i.e., the sample to be grinded and the grinding balls) to the liquid medium may be between 1:1 to 1:2.

For providing the bone substitute composition, a mixture may be produced by mixing the alkaline calcium phosphate powder and the polymer with the crosslinker together, wherein the mixture may include 85% to 98% by weight of the alkaline calcium phosphate powder, 1% to 10% by weight of the polymer, and 1% to 5% by weight of the crosslinker.

Next, for facilitating the crosslinking, the mixture may be mixed with and dispersed in a dispersing agent to obtain a mixed solution with a shear rate between 1% to 10%, which represents that the mixture has been uniformly dispersed into the mixed solution.

Next, for obtaining the bone substitute composition by removing the dispersing agent from the mixed solution, the mixed solution may be treated by a freeze-drying process, such that the dispersing agent in the mixed solution may sublimate from the solid state into gas state in a high vacuum, low temperature environment of the freeze-drying process, and subsequently be removed by condensing from the gas state into the liquid state. In this embodiment, the removal of the dispersing agent is performed at a temperature between $-20°$ C. to $-80°$ C. and a vacuum level between $2\times10^{-3}$ Torr to $25\times10^{-3}$ Torr.

The reshapable clayey bone substitute can be formed by mixing the resulting bone substitute matrix with the conditioning solution, and can gradually harden to form the non-reshapable, rigid skeletal bone substitute.

Specifically, the conditioning solution can include 1% to 5% by weight of a phosphate, which provides phosphate ions ($PO_4^{3-}$) for reacting with calcium ions ($Ca^{2+}$) provided by the alkaline calcium phosphate powder of the bone substitute matrix. For example, the phosphate may be sodium hydrogen phosphate ($Na_2HPO_4$), sodium dihydrogen phosphate ($NaH_2PO_4$), or other phosphates that can provide phosphate ions. Alternatively, the phosphate can be a mixture of at least two of these phosphates.

The conditioning solution may further comprise 1% to 5% by weight of a water-soluble acidic compound. For example, the water-soluble acidic compound may be phosphoric acid ($H_3PO_4$), a bifunctional organic acid, a polycyclic acid, or citric acid ($C_6H_8O_7$). Alternatively, the compound may be a mixture of at least two of these water-soluble acidic compounds.

The remaining constituent of the conditioning solution can be water (e.g., 90% to 97% by weight).

It is noted that the volume ratio of the bone substitute matrix to the conditioning solution is preferably between 1:1 to 1:3, which ensures that the clayey bone substitute can gradually harden to form the skeletal bone substitute after 30 minutes of the mixing of the bone substitute matrix with the conditioning solution. This may maintain the efficiency of bone substitute surgeries, improving the quality and reducing the cost of such surgeries.

In addition, the bone substitute composition of the present invention may further include an additive of at least one trace element that is absorbable or metabolizable by a human body. The trace element includes but is not limited to calcium (Ca), magnesium (Mg), potassium (K), zinc (Zn), iron (Fe), and copper (Cu). Accordingly, effects of regeneration and repair of bone cells can be increased.

According to the foregoing description, a physician may mix the bone substitute matrix and the conditioning solution to obtain the bone substitute composition, and then shape the bone substitute composition by hand, in which the bone substitute composition can be reshaped at will since the bone substitute composition is a clayey bone substitute having the Atterberg plastic index between 18 to 30 at this time. Therefore, the physician may shape the clayey bone substitute to have a desired shape (which may match the shape of a bone defect, for example), and then substitute the clayey bone substitute having the desired shape into the bone defect. Alternatively, the physician may also substitute the clayey bone substitute into the bone defect directly, in which the clayey bone substitute will gradually harden to form a non-reshapable skeletal bone substitute after 30 minutes of the mixing of the bone substitute matrix with the conditioning solution. Therefore, the skeletal bone substitute has a shape which matches that of the bone defect after the clayey bone substitute completely hardens to form the skeletal bone substitute, and the bone substitute surgery is completed.

Experiment A: The Effect on Physical Properties

To test the performance of the bone substitute compositions disclosed herein, the bone substitute composition in each group was produced by mixing alkaline calcium phosphate powder, powder of a polymer, and a crosslinker with the ratios shown in table 1 to form bone substitute matrices, and then respectively mixing the bone substitute matrices with a conditioning solution having a volume which is 1 to 3 times of the volume of each bone substitute matrix, with the conditioning solution including 94.5% by weight of water, 2.5% by weight of sodium hydrogen phosphate, and 3% by weight of citric acid. The physical properties of the bone substitute composition in each group were tested and recorded in table 2 after the bone substitute compositions hardened completely to form skeletal bone substitutes.

TABLE 1 the constituent ratios of the bone substitute composition in each group tested in this experiment.

| Group | Alkaline calcium phosphate powder[1] | Polymer[2] | Crosslinker[3] |
|---|---|---|---|
| A1 | 98.0% | 1.0% | 1.0% |
| A2 | 97.5% | 1.5% | 1.0% |
| A3 | 96.5% | 2.0% | 1.5% |
| A4 | 95.0% | 2.5% | 2.5% |
| A5 | 92.0% | 5.0% | 3.0% |
| A6 | 85.0% | 10.0% | 5.0% |

[1]including TTCP powder and MCPM powder, the molar ratio of which is 7:2.
[2]collagen.
[3]1,4-butanediol diglycidyl ether.

TABLE 2 the physical properties of the bone substitute composition in each group tested in this experiment.

| Group | Compressive Resistance (N/mm$^2$ · cm)[1] | Bend Angle (°)[2] | Compressive Strength (MPa)[3] | Ability to resist disintegration[4] |
|---|---|---|---|---|
| A1 | 11.7 | 55 ± 8.2 | 3.7 | + |
| A2 | 62.6 | 86 ± 16.8 | 3.5 | + |
| A3 | 102.2 | 133 ± 10.5 | 3.6 | + |
| A4 | 197.8 | >180 | 3.6 | + |
| A5 | 10.8 | >180 | 2.6 | − |
| A6 | 24.4 | >180 | 1.4 | − |

[1]measured by compressing the bone substitute composition (2.5 × 2.5 × 0.5 cm$^3$) in each group via a round plate (with 2 cm diameter) of a MTS machine at a speed of 0.05 mm/s, and plotting a chart regarding the displacement distance and the subjected pressure of the bone substitute compositions to obtain a compression curve for the bone substitute composition in each group; the compressive resistance of the bone substitute composition in each group can be calculated from the area under curve (AUC) of the corresponding compression curve.
[2]measured by shaping the bone substitute composition in each group to be a rectangular strip having a size of 10 × 30 × 2 mm$^3$, and bending the rectangular strip from the center thereof in a range of 0° to 180°, with the angle at which the rectangular strip fractured being the bend angle of the bone substitute composition.
[3]measured in accordance with the provisions of ISO 5833.
[4]determined by sinking the bone substitute composition in each group into a phosphate buffered saline (PBS, pH 7.4) at 37° C. for 1 day, and observing the structural integrity of the bone substitute composition, in which the situation that the structure of the bone substitute composition did not collapse was marked as "+", and the situation that the structure of the bone substitute composition collapsed into some lumps and the structure was unstable was marked as "−".

As shown in table 2, the compressive resistance and the bend angle of the bone substitute compositions both increase as the ratio of the polymer powder increases.

Figure 2:
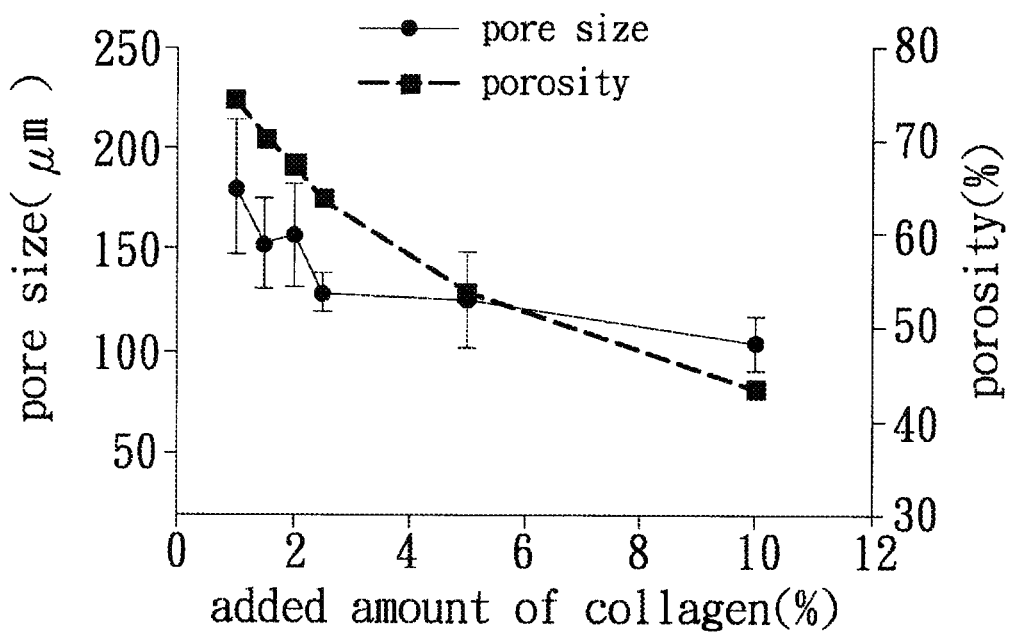
FIG. 2 is a schematic chart illustrating changes in pore size and porosity after hardening of the bone substitute compositions in groups A1 to A6 according to the added amount of collagen in accordance with the Experiment A of the present invention.
Figure 3:
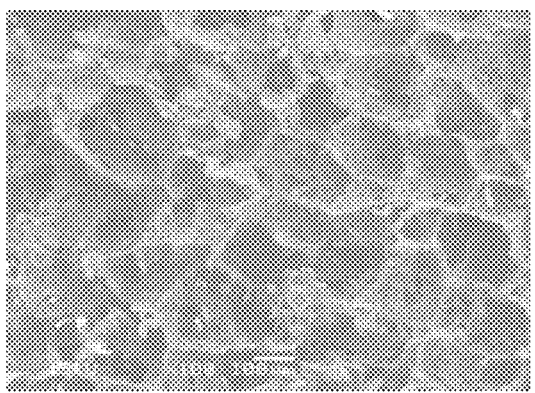
FIG. 3 is a microscope image of the bone substitute composition in group A1 before hardening in accordance with the Experiment A of the present invention.
Figure 4:
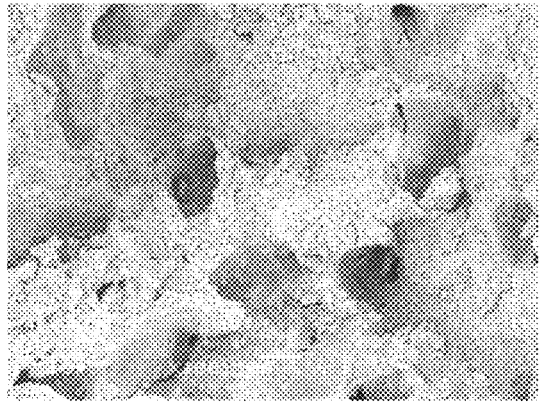
FIG. 4 is a microscope image of the bone substitute composition in group A1 after hardening in accordance with the Experiment A of the present invention.
Figure 5:
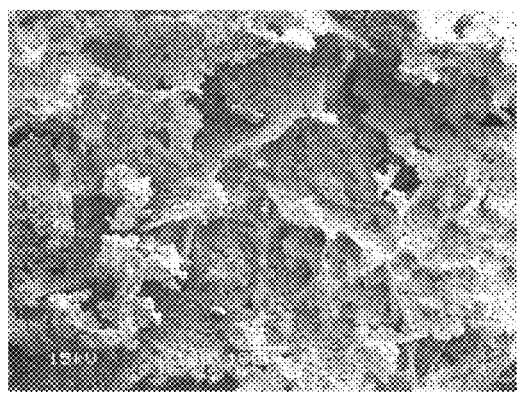
FIG. 5 is a microscope image of the bone substitute composition in group A2 before hardening in accordance with the Experiment A of the present invention.

The pore size and porosity of the bone substitute compositions in groups A1 to A6 before and after the bone substitute compositions hardened were also analyzed by capturing surface images of the bone substitute compositions via a scanning electron microscope (SEM), and then calculating the average pore size and porosity of the bone substitute compositions via an image processing software, Image J. As shown in FIGS. 1 and 2, the pore size and porosity of the bone substitute compositions after the bone substitute compositions hardened both decrease as the ratio of the polymer powder increases.

Figure 6:
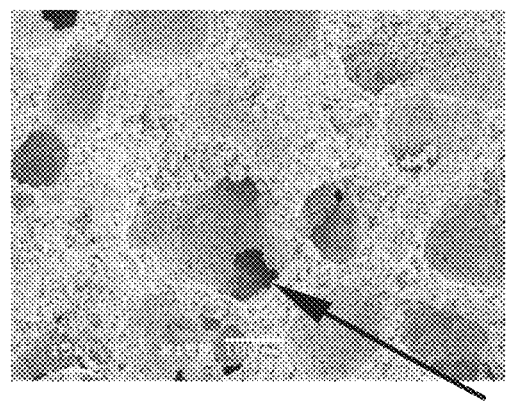
FIG. 6 is a microscope image of the bone substitute composition in group A2 after hardening in accordance with the Experiment A of the present invention, wherein the black arrow indicates the location of an open pore.
Figure 7:
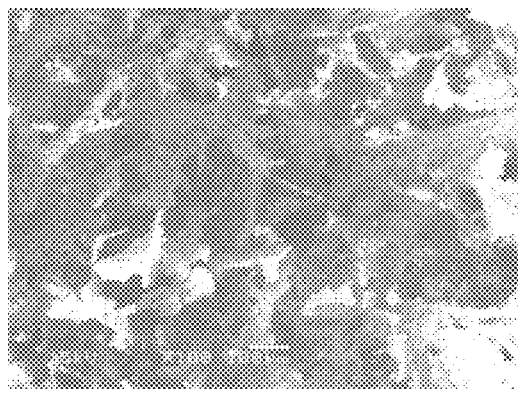
FIG. 7 is a microscope image of the bone substitute composition in group A3 before hardening in accordance with the Experiment A of the present invention.
Figure 8:
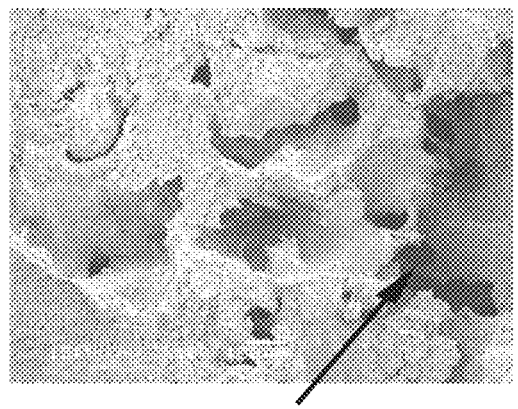
FIG. 8 is a microscope image of the bone substitute composition in group A3 after hardening in accordance with the Experiment A of the present invention, wherein the black arrow indicates the location of an open pore.
Figure 9:
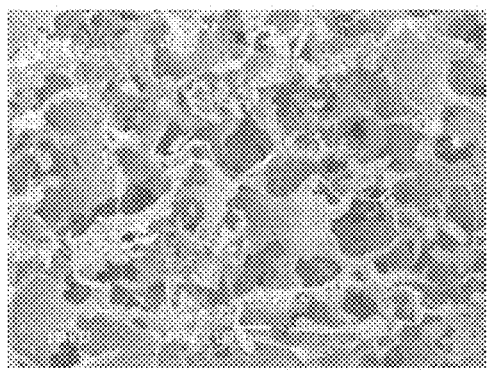
FIG. 9 is a microscope image of the bone substitute composition in group A4 before hardening in accordance with the Experiment A of the present invention.
Figure 10:
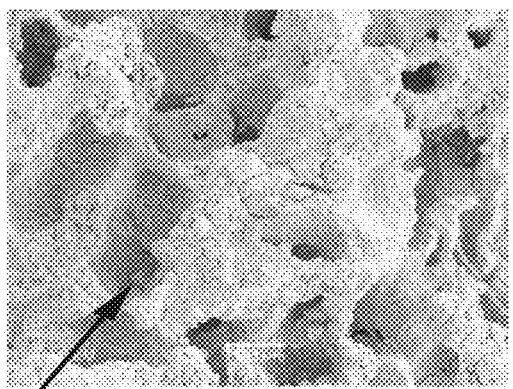
FIG. 10 is a microscope image of the bone substitute composition in group A4 after hardening in accordance with the Experiment A of the present invention, wherein the black arrow indicates the location of an open pore.
Figure 11:
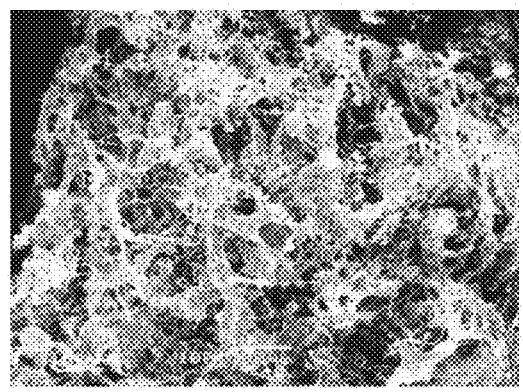
FIG. 11 is a microscope image of the bone substitute composition in group A5 before hardening in accordance with the Experiment A of the present invention.
Figure 12:
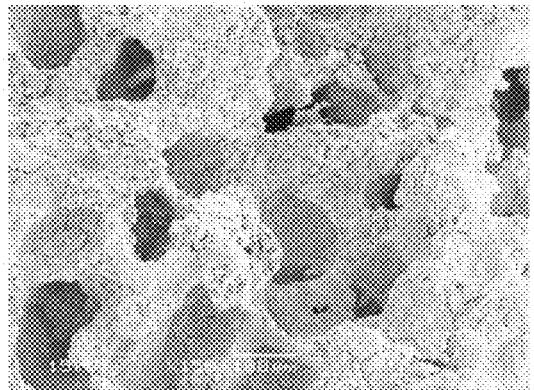
FIG. 12 is a microscope image of the bone substitute composition in group A5 after hardening in accordance with the Experiment A of the present invention.
Figure 13:
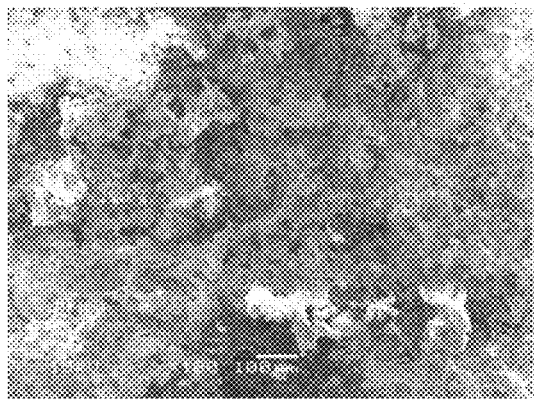
FIG. 13 is a microscope image of the bone substitute composition in group A6 before hardening in accordance with the Experiment A of the present invention.
Figure 14:
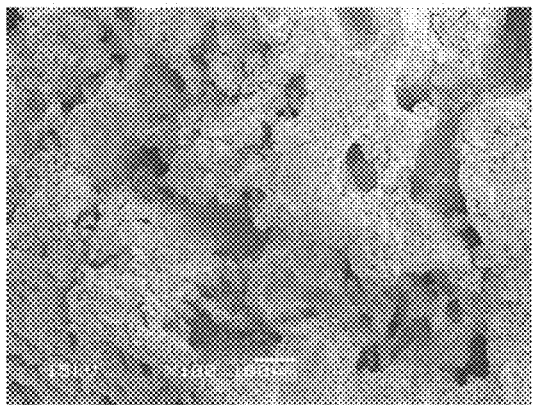
FIG. 14 is a microscope image of the bone substitute composition in group A6 after hardening in accordance with the Experiment A of the present invention.

As shown in FIGS. 6, 8, and 10, open pores are only present in the bone substitute compositions in groups A2 to A4 after the bone substitute compositions hardened, indicating that the addition of the polymer may increase pore size and porosity of the skeletal bone substitutes and facilitate the delivery of nutrients and angiogenesis. Moreover, this may ensure that the substituted bones still have a certain level of mechanical strength to provide a better growth environment for bone cells.

On the basis of the experiment data, the addition of the powder of the polymer may aid improving the physical properties of the bone substitute compositions, wherein the physical properties of the bone substitute composition in group A4 are the best.

Experiment B: Analysis of Particle Size Distribution

Figure 15:
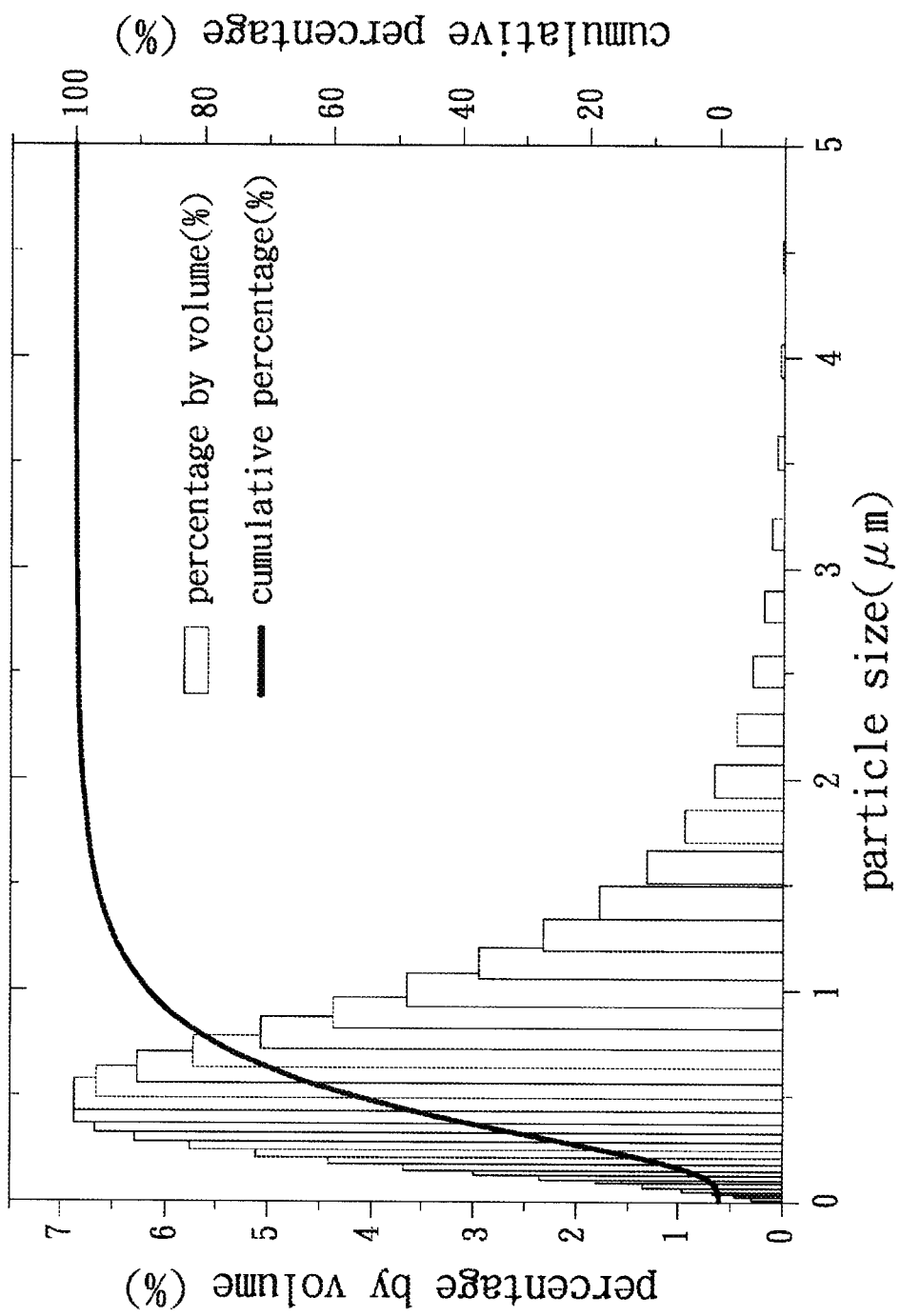
FIG. 15 shows an analysis result of a particle size analyzer for the bone substitute composition in accordance with the Experiment B of the present invention.

Next, the particle size of the bone substitute composition in group A4 were analyzed by a laser scattering particle size analyzer. As shown in FIG. 15, the particle size of the bone substitute composition is generally between 0.10 μm to 1.04 μm (accounting for about 90%), and the average particle size of the bone substitute composition is about 0.56 μm.

Experiment C: The Effect on Bone Cells

As shown in table 3, this experiment was carried out by: providing D1 bone marrow cells (CRL-12424) as cell lines;

adding a conventional bone substitute composition (including calcium phosphate bone cement and a conditioning solution) and the bone substitute composition of the bone substitute composition in group A4 into the cell lines, respectively; culturing the bone substitute compositions with the cell lines at a temperature of 37° C. and a concentration of carbon dioxide of 5% for 7 days, and collecting the cell culture medium on the $1^{st}$, $3^{rd}$, and $7^{th}$ days; reacting the bone cells with an alkaline phosphatase assay kit (ALP) for 1 hour; and measuring the absorbance of the bone cells at a wavelength of 405 nm, and calculating the relative activity of alkaline phosphatase in the bone cells of each group on the basis of the measured absorbances. The bone cells in group C0 were untreated D1 bone marrow cells.

TABLE 3 samples for treating the cells in this experiment.

| Group | Sample | |
|---|---|---|
| | Bone cement | Conditioning solution[1] |
| C0 | – | – |
| C1 | calcium phosphate bone cement[2] | + |
| C2 | the bone substitute composition in group A4 | |

[1]including 94.5% by weight of water, 2.5% by weight of sodium hydrogen phosphate, and 3% by weight of citric acid.
[2]including TTCP powder and MCPM powder, the molar ratio of which is 7:2.

Figure 16:
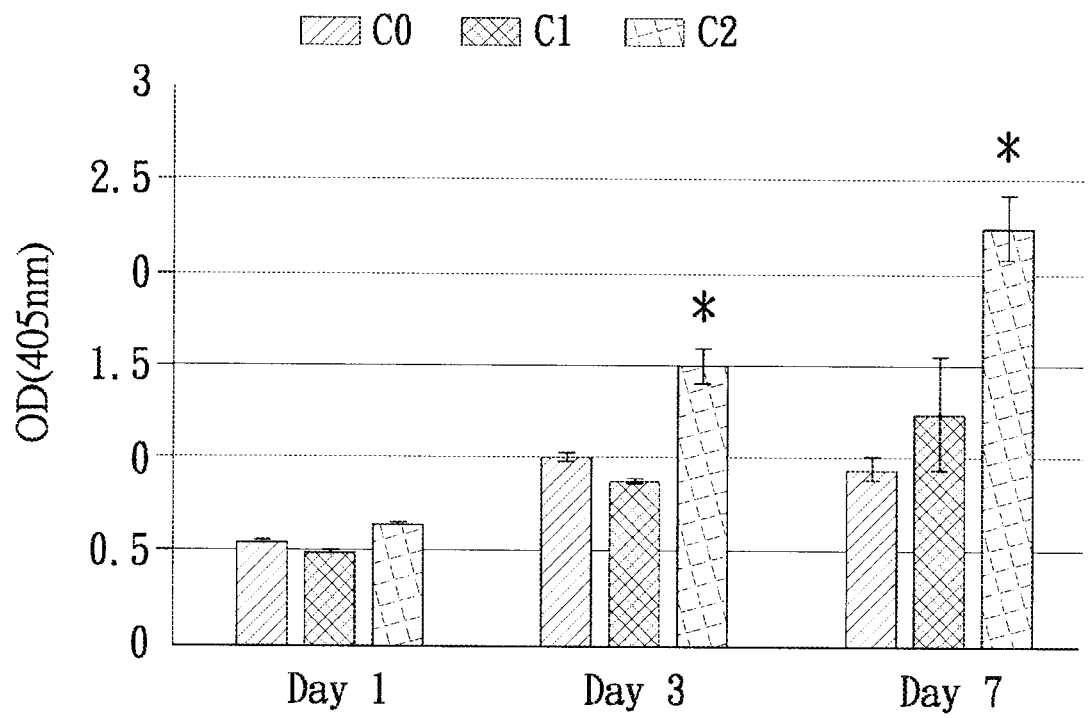
FIG. 16 is a schematic chart showing the differentiation ratios of the bone cells in groups C0 to C2 in accordance with the Experiment C of the present invention, in which * means p value<0.05 compared with group C0.

As shown in FIG. 16, the conventional bone substitute composition is unable to facilitate the differentiation of the bone cells (group C1); in contrast, the skeletal bone substitute formed from the bone substitute composition of the present invention can facilitate the differentiation of the bone cells (group C2).

Additionally, the bone cells in groups C0 to C2 were cultured at a temperature of 37° C. and a concentration of carbon dioxide of 5% for 7 days; the calcium precipitates of each group were dyed with Alizarin Red S (ARS) and dried; the dried, dyed calcium precipitates dissolved in a dilute hydrochloric acid solution, and the absorbance of the dyed calcium precipitates were measured at a wavelength of 450 nm, and the ratio of the mineralized bone cells were calculated on the basis of the measured absorbances.

Figure 17:
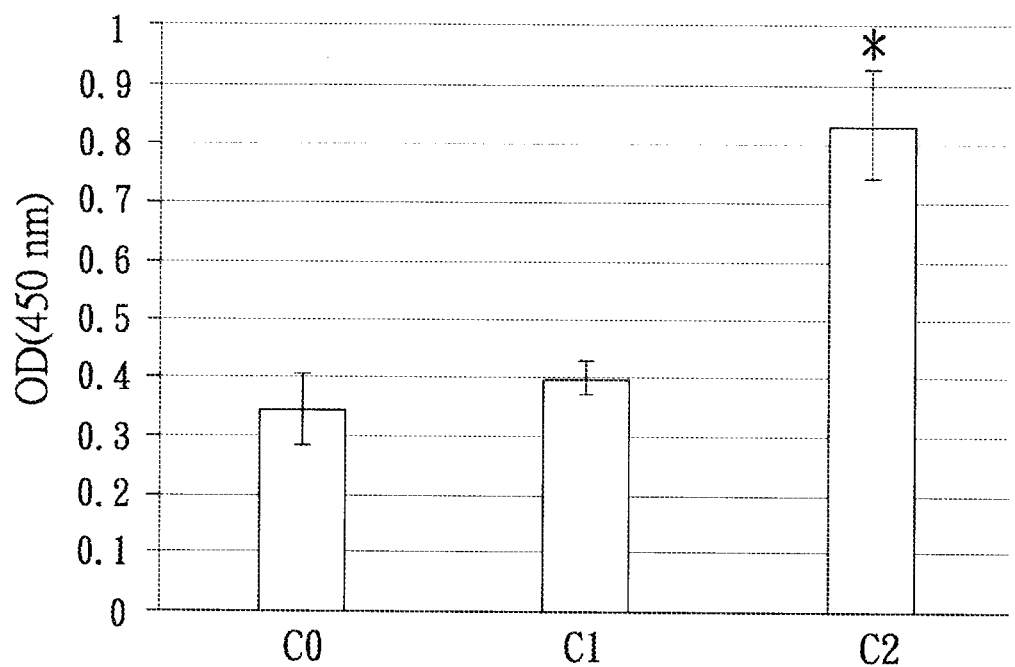
FIG. 17 is a schematic chart showing the mineralization ratios of the bone cells in groups C0 to C2 in accordance with the Experiment C of the present invention, in which * means p value<0.01 compared with group C0.
Figure 18:
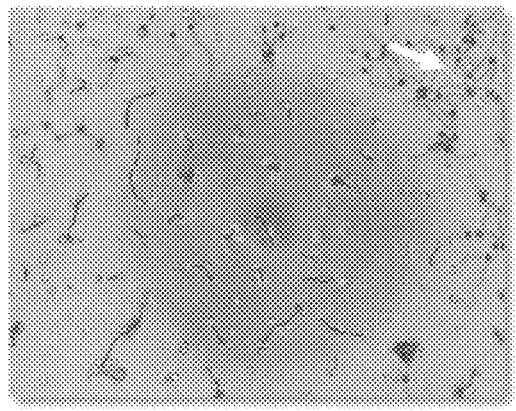
FIG. 18 is a microscope image of the cells in group D0, showing the morphology of the blood vessel formed by the cells in group D0 in accordance with the Experiment D of the present invention, in which the white arrow indicates the location of the node.
Figure 19:
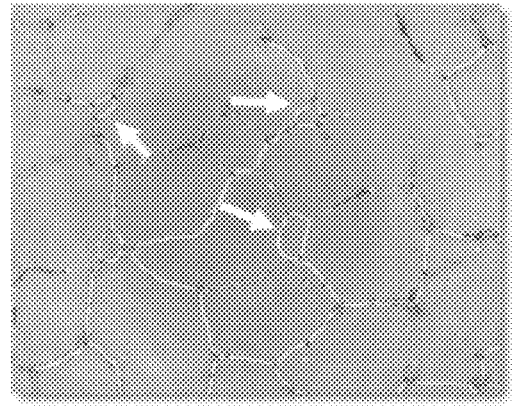
FIG. 19 is a microscope image of the cells in group D1, showing the morphology of the blood vessel formed by the cells in group D1 in accordance with the Experiment D of the present invention, in which the white arrows indicate the location of the nodes.
Figure 20:
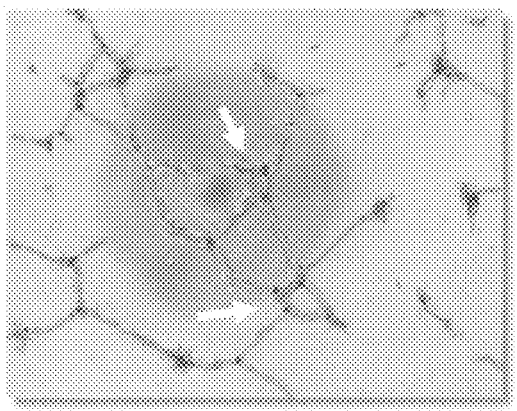
FIG. 20 is a microscope image of the cells in group D2, showing the morphology of the blood vessel formed by the cells in group D2 in accordance with the Experiment D of the present invention, in which the white arrows indicate the location of the nodes.
Figure 21:
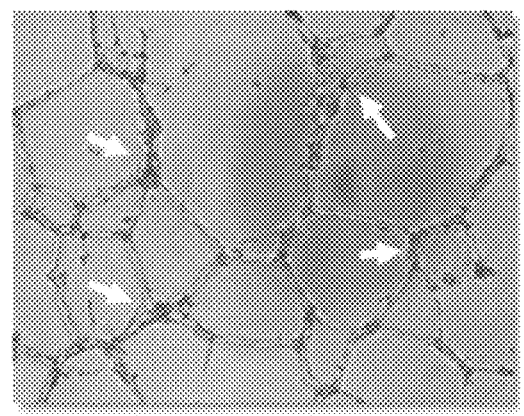
FIG. 21 is a microscope image of the cells in group D3, showing the morphology of the blood vessel formed by the cells in group D3 in accordance with the Experiment D of the present invention, in which the white arrows indicate the location of the nodes.

As shown in FIG. 17, the conventional bone substitute composition is unable to facilitate the mineralization of the bone cells (group C1); in contrast, the bone substitute composition of the present invention can facilitate the mineralization of the bone cells (group C2).

Experiment D: The Effect on Angiogenesis

As shown in table 4, this experiment was carried out by: providing human umbilical vein endothelial cells (CRL-1730) as cell lines; adding a conventional bone substitute composition (including calcium phosphate bone cement and a conditioning solution) and the bone substitute composition of the bone substitute composition in group A4 into the cell line, respectively; culturing the bone substitute compositions with the cell lines at a temperature of 37° C. and a concentration of carbon dioxide of 5% for 1 day; and observing the cell lines in a bright field by an optical microscope. The cells in group D0 were untreated human umbilical vein endothelial cells, and the cells in group D1 were human umbilical vein endothelial cells treated with secreted protein culture medium of RAW 264.7 cell as a positive control group.

TABLE 4 samples for treating the cells in this experiment.

| Group | Sample | | |
|---|---|---|---|
| | Bone cement | Conditioning solution[1] | secreted protein culture medium of RAW 264.7 cell |
| D0 | – | – | – |
| D1 | – | – | + |
| D2 | calcium phosphate bone cement[2] | + | – |
| D3 | the bone substitute composition in group A4 | | – |

[1]including 94.5% by weight of water, 2.5% by weight of sodium hydrogen phosphate, and 3% by weight of citric acid.
[2]including TTCP powder and MCPM powder, the molar ratio of which is 7:2.

As shown in FIGS. 18-21, although the conventional bone substitute composition may add increasing the number of node (group D2), the efficiency of which is not as good as the efficiency of the skeletal bone substitute formed from the bone substitute composition of the present invention (group D3).

Figure 22:
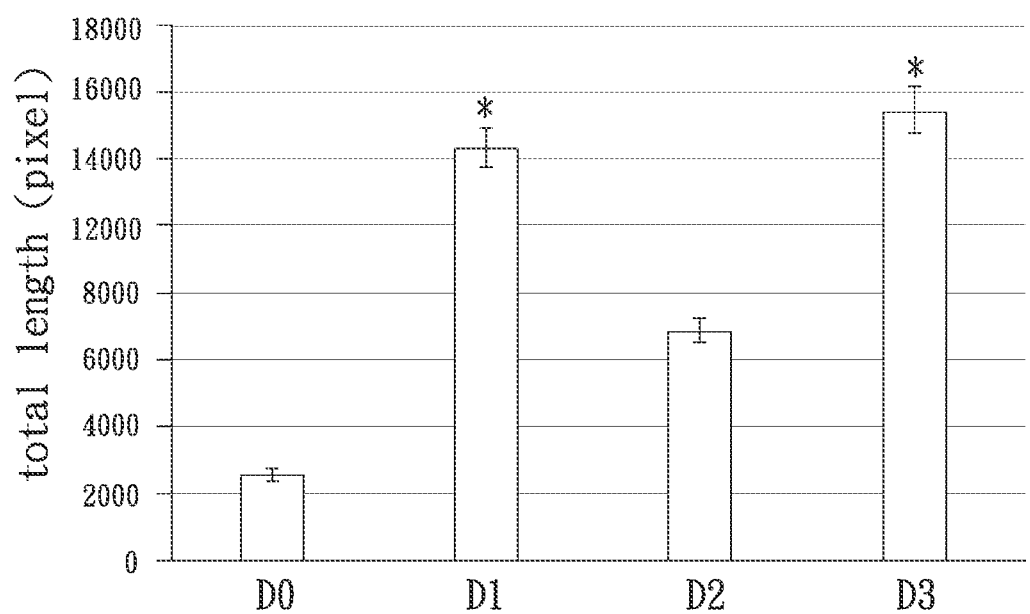
FIG. 22 is a schematic chart showing the total blood vessel length of the cells in groups D0 to D3 in accordance with the Experiment D of the present invention, in which * means p value<0.001 compared with group D0.

The blood vessel length of the cells in groups D0-D3 is also analyzed. As shown in FIG. 22, the skeletal bone substitute formed from the bone substitute composition of the present invention may add increasing the length of the blood vessel cells (group D3).

In summary, the bone substitute composition of the present invention may transform into a clayey bone substitute with plasticity after the bone substitute matrix is mixed with the conditioning solution, and the clayey bone substitute may be reshaped at will by applying a force within 10 to 30 minutes after the formation of the clayey bone substitute. The clayey bone substitute gradually hardens and transforms into a non-reshapable, rigid skeletal bone substitute after 30 minutes of the formation of the clayey bone substitute. Accordingly, a physician may mix the bone substitute matrix and the conditioning solution to obtain the clayey bone substitute, substitute the clayey bone substitute into a defect of a damaged bone by hand (or other surgical instruments other than an injector), and wait for the hardening of the clayey bone substitute to form a skeletal bone substitute having a similar shape as the defect. Therefore, the present invention bone substitute provides an effect for improving the convenience of surgery.

Although the invention has been described in detail with reference to its presently preferable embodiments, it will be understood by one of ordinary skill in the art that various modifications can be made without departing from the spirit and the scope of the invention, as set forth in the appended claims.

What is claimed is:
1. A bone substitute composition comprising:
   a bone substitute matrix including 85% to 98% by weight of alkaline calcium phosphate powder, 1% to 10% by weight of a polymer, and 1% to 5% by weight of a crosslinker; and
   a conditioning solution including 90% to 97% by weight of water, 1% to 5% by weight of a phosphate, and 1% to 5% by weight of a water-soluble acidic compound.
2. The bone substitute composition of claim 1, wherein the volume ratio of the bone substitute matrix to the conditioning solution is between 1:1 to 1:3.

3. The bone substitute composition of claim 1, wherein the particle size of the alkaline calcium phosphate powder is between 10 to 1200 μm.

4. The bone substitute composition of claim 1, wherein the alkaline calcium phosphate powder is selected from at least two of tetracalcium phosphate powder, monocalcium phosphate monohydrate powder, dibasic calcium phosphate powder, calcium sulfate hemihydrate powder, tricalcium phosphate powder, and monocalcium phosphate anhydrate powder.

5. The bone substitute composition of claim 4, wherein the alkaline calcium phosphate powder includes the tetracalcium phosphate powder and the monocalcium phosphate monohydrate powder, and wherein the molar ratio of the tetracalcium phosphate powder to the monocalcium phosphate monohydrate powder is between 3:1 to 5:1.

6. The bone substitute composition of claim 4, wherein the alkaline calcium phosphate powder includes the tetracalcium phosphate powder and the dibasic calcium phosphate powder, and wherein the molar ratio of the tetracalcium phosphate powder to the dibasic calcium phosphate powder is between 1:1 to 1:3.

7. The bone substitute composition of claim 4, wherein the alkaline calcium phosphate powder includes the tetracalcium phosphate powder and the calcium sulfate hemihydrate powder, and wherein the molar ratio of the tetracalcium phosphate powder to the calcium sulfate hemihydrate powder is between 0.5:1 to 2.5:1.

8. The bone substitute composition of claim 4, wherein the alkaline calcium phosphate powder includes the tricalcium phosphate powder and the monocalcium phosphate monohydrate powder, and wherein the molar ratio of the tricalcium phosphate powder to the monocalcium phosphate monohydrate powder is between 1:1 to 1:3.

9. The bone substitute composition of claim 4, wherein the alkaline calcium phosphate powder includes the tricalcium phosphate powder and the monocalcium phosphate anhydrate powder, and wherein the molar ratio of the tricalcium phosphate powder to the monocalcium phosphate anhydrate powder is between 1:1 to 1:2.

10. The bone substitute composition of claim 1, wherein the polymer is at least one selected from the group consisting of chitin, hyaluronic acid, gelatin, collagen, and chitosan.

11. The bone substitute composition of claim 1, wherein the crosslinker is at least one selected from the group consisting of 1,4-butanediol diglycidyl ether, formaldehyde, and pentane-1,5-dial.

12. The bone substitute composition of claim 1, wherein the phosphate is at least one of sodium hydrogen phosphate and sodium dihydrogen phosphate.

13. The bone substitute composition of claim 1, wherein the water-soluble acidic compound is at least one selected from the group consisting of phosphoric acid, a bifunctional organic acid, a polycyclic acid, and citric acid.

14. The bone substitute composition of claim 1, further comprising an additive of at least one trace element, wherein the trace element is absorbable or metabolizable by a human body.

* * * * *